United States Patent [19]
Alb

[11] Patent Number: 5,854,706
[45] Date of Patent: Dec. 29, 1998

[54] SYSTEM FOR VIEWING STEREOSCOPIC IMAGES

[76] Inventor: Cristian I. Alb, 2450 Athlone, #607, Montreal, Quebec, Canada, H3R 3H6

[21] Appl. No.: 730,402

[22] Filed: Oct. 15, 1996

[51] Int. Cl.⁶ ............................. G02B 27/26; H04N 13/00
[52] U.S. Cl. ................................. 359/465; 348/54; 348/58
[58] Field of Search ....................... 359/465, 464, 359/613, 630, 635; 349/15; 348/54, 58; 434/371

[56] References Cited

U.S. PATENT DOCUMENTS

| | | | |
|---|---|---|---|
| 4,559,556 | 12/1985 | Wilkins | 348/58 |
| 5,583,695 | 12/1996 | Dobrusskin | 359/630 |
| 5,634,709 | 6/1997 | Iwama | 359/630 |

FOREIGN PATENT DOCUMENTS

| | | | |
|---|---|---|---|
| 2584830 | 1/1987 | France | 359/465 |
| 3039109 A1 | 5/1982 | Germany | 359/465 |

*Primary Examiner*—Jon W. Henry

[57] ABSTRACT

An improved stereoscopic image displaying system is disclosed. A pair of adjacent image displaying means generate a stereoscopic pair of images. A semitransparent mirror and two polarizing filters merge the two images in the same virtual space and impart distinctive polarization to light rays carrying the two images displayed. A louver type filter suppresses the residual view generated by one of the displaying means. The louvers will allow only the image reflected on said semitransparent mirror to pass. A second louver type filter compensates the attenuation that the first louver type filter has introduced, in such a way that the two combined images are of adequately similar intensity. A user wearing polarizing spectacles can see a clear stereoscopic image from a variety of angles.

3 Claims, 2 Drawing Sheets

SYSTEM FOR VIEWING STEREOSCOPIC IMAGES

BACKGROUND OF THE INVENTION

1. Field of the Invention

The present invention relates generally to systems for producing apparent three dimensional viewing. More particularly, the present invention relates to apparatus useful for displaying stereoscopic images that can be viewed simultaneously by more than one person and from a variety of viewing angles.

2. Description of the Prior Art

For many decades the motion picture and television industries have attempted with various degrees of success to provide viewing systems that provide a sensation of depth or three dimensional viewing to the audience. Lately, with the advent of personal computers the interest has risen for stereoscopic devices that can produce a sensation of virtual reality.

Stereoscopic viewing consists of forwarding the images of a three dimensional scene photographed from two different angles, to each corresponding eye of a viewer. The viewer's brain combines the images so that a resultant image having apparent three dimensional characteristics is observed. The early stereoscopic viewers allowed only one person to view the three dimensional scene due to the fact that they required the viewer to position his eyes just in front of the embodiment of the apparatus.

U.S. Pat. No. 2,084,350 describes a method and apparatus that overcomes the limitation of early stereoscopic viewers by allowing more than one person to simultaneously view three dimensional scenes. It consists of merging a pair of two dimensional prints, photographed at different angles, onto a half silvered mirror through polarizing filters that are oriented at right angles to each other. Viewers are required to wear a pair of special polarizing viewing spectacles that allow each eye to see only one image.

U.S. Pat. No. 2,845,618 extends the previous method not only to static three dimensional scenes but also to dynamic scenes, by substituting static prints with cathode ray tubes.

In these types of stereoscopic systems, the viewer sees the two stereoscopic images as being merged somewhere behind the half silvered mirror. Because in these arrangements the pair of images form a right angle, the viewer will not see directly one of the images but only its reflection on the half silvered mirror. However if the angle formed by the two stereoscopic images is greater than 90 degrees, the viewer could see the residual direct view of the image that should have been seen only through reflection on the half silvered mirror. This is the case when the angle formed by the two images is approximately 180 degrees and therefore the two images lie on the same geometrical plane. In many situations the latter arrangement is preferable because the device could be made less bulky.

French patent 2 584 830 of Tailleur discloses a stereoscopic viewer where the two stereoscopic pictures lie in the same geometrical plane. However this patent does not address the problem of the residual image.

When the two stereoscopic images are adequately spaced apart, the residual view appears to be peripheral to the main visual field and therefore less bothering. However in order to minimize the size of the viewer it is required to have the two images as close as possible. If it is possible to make the two images juxtaposed it would be possible to use one cathode ray tube to display both stereoscopic views. The reduction of the number of image display devices from two to one would make this solution a cost effective one.

U.S. Pat. No. 4,559,556 illustrates a solution that allows the use of only one cathode ray tube to display the two stereoscopic images. The cathode ray tube displays the pair of stereoscopic images one on top of the other. It uses spectacles that have adjustable shifting lens to superimpose the two areas of the screen that display the stereoscopic pairs. A drawback associated with this solution is that, after the adjustment of the shifting lens is made, the observer is forced to a fixed viewing position. This is due to the fixed vertical compensation in the viewing spectacles.

SUMMARY OF THE INVENTION

It is an object of the present invention to provide an improved stereoscopic display system that allows observers wearing polarizing spectacles to view a stereoscopic effect from a variety of angles and distances.

A further object of the present invention is to allow the two image displaying devices to be juxtaposed, or slightly spaced apart, in order to provide a more compact stereoscopic viewing system.

A further object of the present invention is to allow the use of only one displaying device to produce the stereoscopic image pair.

A further object of the present invention is to allow observers to see only the stereoscopic view of the scene and prevent observers from viewing parasitic or residual images generated by the two image displaying devices.

A further object of the present invention is to allow observers to get an optimal stereoscopic effect where the two images representing the left and right view of the three dimensional scene are of adequately similar intensity.

BRIEF DESCRIPTION OF THE DRAWINGS

The present invention will be more fully understood by reference to the following detailed description when read in conjunction with the attached drawings, wherein.

DETAILED DESCRIPTION OF THE INVENTION

The present invention relates generally to stereoscopic viewers that use polarizing means and a semitransparent mirror to combine two distinct images on a common viewing area. The functioning of this type of devices will be explained with the help of FIG. 1.

Figure 1:
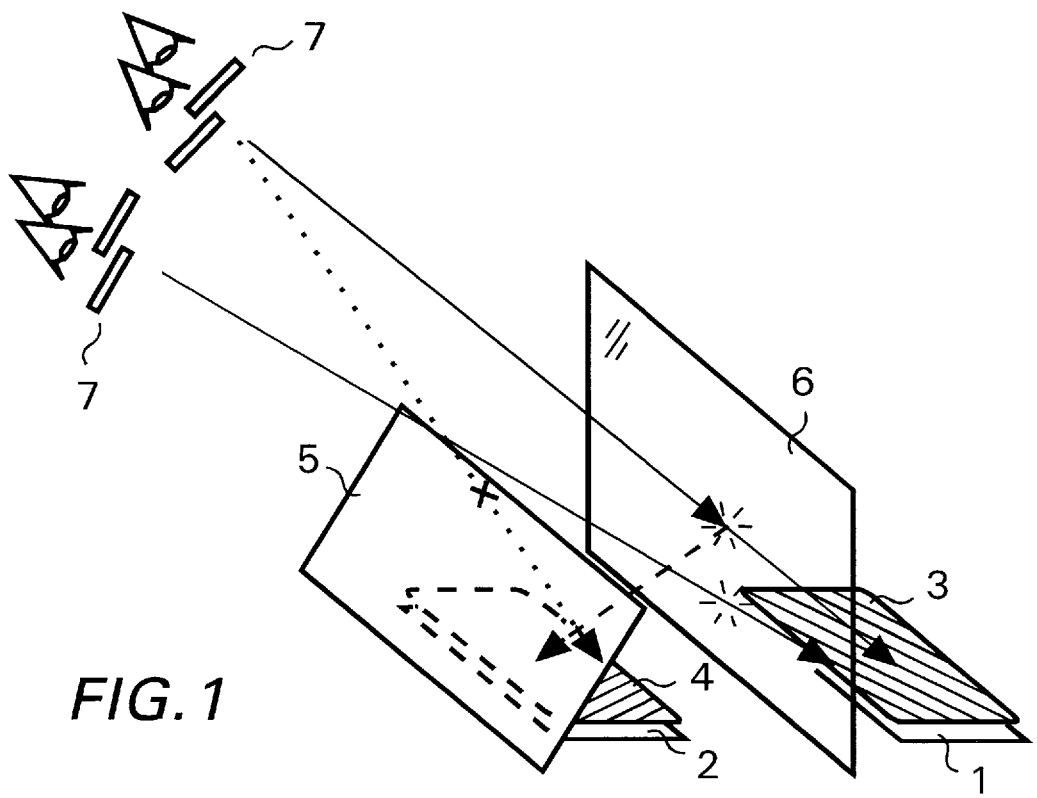
FIG. 1 is a diagram that illustrates the problem of the residual image for stereoscopic viewers that have two stereoscopic images that lie in the same geometrical plane and are conveniently spaced apart.

With reference to FIG. 1 elements 1 and 2 represent a pair of approximately flat image display elements. These means could be, as in Tailleur's patent, a pair of stereoscopic pictures. Element 1 is the picture showing the right eye view of a three dimensional scene, while element 2 is the picture showing the reversed left eye view of the same three dimensional scene. The two pictures form a symmetrical pair with respect to element 6, a semitransparent mirror. Element 6 is a plane surface that is partially light reflecting and partially light transmitting. The role of said semitransparent mirror is to merge the light rays coming from the two different pictures.

Elements 3 and 4 are a pair of polarizing means that impart distinctive light ray polarization to the two images displayed by pictures 1 and 2.

Element 7 illustrates the viewing device in front of the viewer's eyes. It consists of a pair of polarizing filters oriented in such a way that the left filter suppresses the image corresponding to the right view of the scene while the right filter suppresses the image corresponding to the left eye view of said three dimensional scene. The observer 7 has to look toward the right eye view picture 1 in order to see the stereoscopic effect and get the three dimensional sensation associated with it. However if the observer 7 looks down, toward image 2, he can see a residual image that has no stereoscopic property. This residual view is more apparent when pictures 1 and 2 are not sufficiently spaced apart. Although this residual view is peripheral to the vision field when the observer 7 looks toward picture 1, it is nonetheless an undesirable effect. In order to eliminate this effect filtering means 5, have to be added.

In the example shown in FIG. 1, a realization for the filtering means could be an opaque screen, conveniently placed as shown by element 5. Element 5 does not allow the observer 7, to see directly the image displayed by element 2. The observer can see said image only through reflection on the semitransparent mirror 6 as shown by the interrupted arrow in FIG. 1. The dotted arrow shows that the sight line hits the opaque surface before reaching directly image 2. Thus the opaque surface hides from the viewer the direct sight of 2. This happens for a range of vertical angular positions of the viewer. This implies that depending on the geometry of the embodiment, the viewers can watch from different heights the device and get the optimal stereoscopic effect. Is to be noted that there are no restrictions regarding the lateral position of the viewers. They will get the stereoscopic effect from any lateral position as long as they can still see the displaying means through the semitransparent mirror.

The disadvantage of the solution described above is that it requires the two images 1 and 2 to be spaced apart. This is necessary in order to completely suppress the residual view of element 1. In order to have a greater vertical angular range from where to watch the three dimensional scene, said distance has to be greater. This could be an important draw back as it increases the size of the stereoscopic viewer assembly. The impact of this requirement is even worse if we want to use only one CRT to display the pair of stereoscopic images. By spacing apart the two displaying regions a significant displaying surface will be lost which in turns means lower resolution or definition for the stereoscopic effect.

Figure 2:
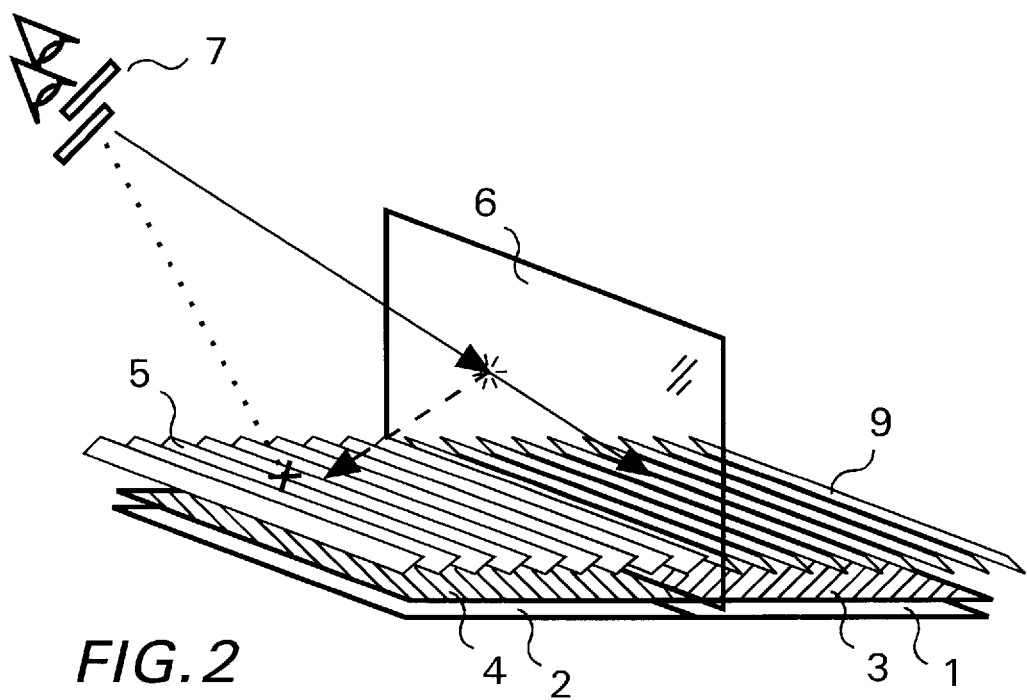
FIG. 2 is a schematic representation of an embodiment of the present invention.

FIG. 2 is a schematic representation of an embodiment of the present invention. This arrangement solves the above mentioned problem. In this diagram the image displaying means 1 and 2 have been juxtaposed. In this diagram the role of the opaque surface has been taken by a louver type filter, 5.

With reference to FIG. 2, elements 1 and 2 represents a pair of approximately flat image displaying means. These means could be either a pair of cathode ray tubes (CRT), plasma gas displays, LED displays, liquid crystal displays (LCD), screens on which images are projected from the rear, or any other graphical displaying means. The two displaying means are placed so that they form a symmetrical pair. The displays will be synchronised to always display the proper left and right eye view of a three dimensional scene. One of said displaying means should display the corresponding eye view as being reversed in a mirror.

Elements 3 and 4 are a pair of polarizing filtering means such as sheets of dichroic polarizers. These sheets polarize the beams carrying the stereoscopic images. They are positioned in such a way as to have the polarizing direction of beams carrying the left eye view, to be orthogonal on the polarizing direction of beams carrying the right eye view.

Element 6 is a plane surface which is partially light reflecting and partially light transmitting. This surface may be of any type that accomplishes the desired result. The semitransparent mirror will be placed symmetrically between the two displaying means. The role of said semitransparent mirror is to merge the light rays coming from the two different image displaying means. The resulting image should give the impression that both the right eye view image and the left eye view image came from the same place. The orientation of the polarizing means and the type of the semitransparent mirror will be chosen in such a way that the luminous intensity of the resulting two polarized images is adequately similar.

Element 7 illustrates the viewing device in front of the viewer's eyes. The viewing device is identical with the one described in FIG. 1. It consists of a pair of polarizing filters oriented in such a way that the left filter suppresses the image corresponding to the right view of the scene while the right filter will suppress the image corresponding to the left eye view of said three dimensional scene.

Figure 4:
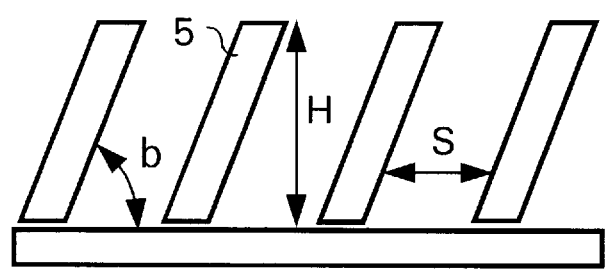
FIG. 4 is a diagram that shows details of one embodiment for the louver type filter element that eliminates the residual view.

Element 5 is a louver type filter that suppresses the residual image generated by image display 2. It consists of a series of tiny parallel slats that have a given inclination and form a grating like frame. The tiny slats are parallel to the intersection between the semitransparent mirror and the surface defined by elements 1 and 2. FIG. 4 is a diagram showing the geometrical details of a louver type filter. In FIG. 4 the inclination of the slats is expressed by the angle "b". The distance separating the slats is expressed by "S" and the height of the slats is expressed by "H". Is worthwhile to notice that the ratio between "S" and "H" counts and not the absolute values. It would be preferable for this grating like frame to be as thin as possible. Element 5 attenuates light rays that traverse it. The degree of attenuation varies with the incidence angle of the light rays. As intuitively can be seen in FIG. 2, light rays going directly from the displaying element 2 toward the viewer hit the surface of the stripes as shown by the dotted line. If light rays originating from element 2 go towards the semitransparent mirror, they can pass with little attenuation. As the attenuation provided by this type of filters varies with the inclination of the incident light rays, the intensity of the reflected image of element 2 will vary together with the position of the viewer. In order to get a proper stereoscopic effect it is very important for the two combined images to be of adequately similar intensity. In order to provide a similar degree of attenuation on both images, regardless of the viewing angle, element 9 has been added.

Element 9 is a louver type filter similar to element 5. The louver type filter 9 is placed in such a way that the two louver type filters are symmetrical with respect to the semitransparent mirror 6. This particular configuration will insure that the attenuation of the intensity of the displayed images varies equally for the two.

A useful development in the configuration described above is to use only one image displaying device that has two juxtaposed displaying areas, instead of using two separate display devices as it is the case in cited prior art. This development is shown in FIG. 3.

Figure 3:
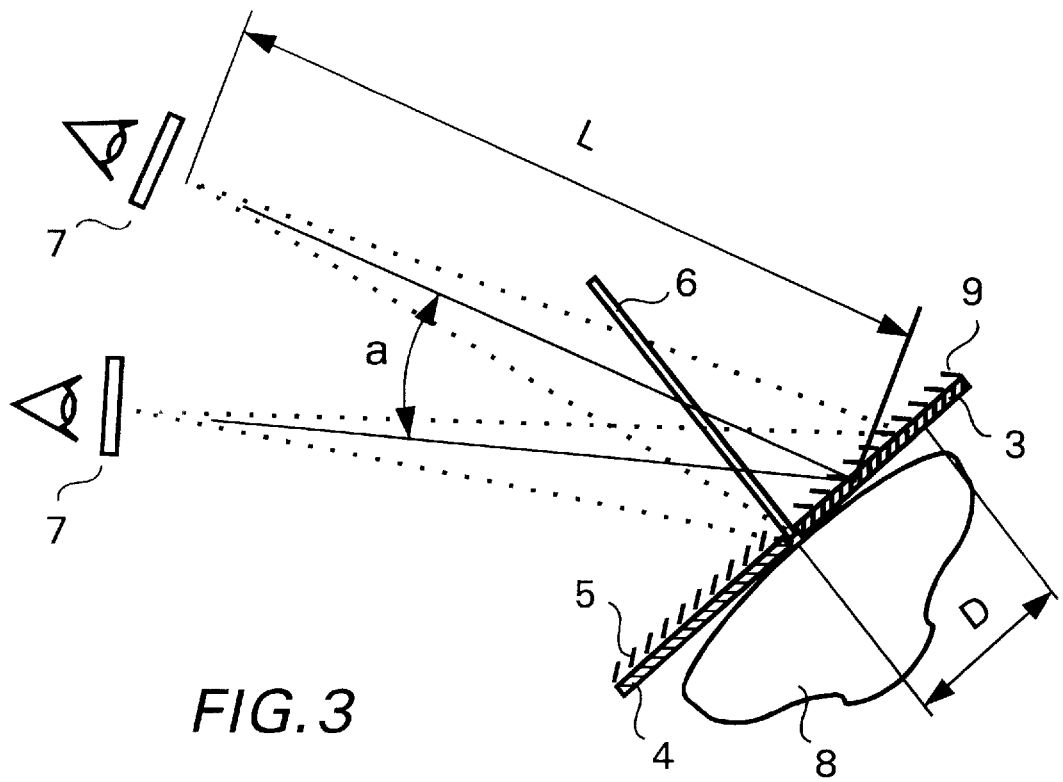
FIG. 3 is a schematic section view of another embodiment of the present invention where the two stereoscopic images are generated by a cathode ray tube.

FIG. 3 is a diagram showing a section view through another embodiment of the present invention. The role of image displaying means 1 and 2 from FIG. 2 has been taken by element 8 which is a cathode ray tube that is part of a TV set or computer monitor. The screen of the CRT (8) is divided into two juxtaposed areas. The upper area displays the right eye view of a three dimensional scene while the lower area displays the corresponding reversed left eye view of the three dimensional scene.

The fact that the image displaying means can be two displaying regions of the same physical device is one of the major advantages of the current invention. It allows the construction of more economical stereoscopic display systems. Furthermore the present invention can be used to build a stereoscopic device by simply attaching an embodiment containing the optical elements to a regular CRT display. This would enable the transformation of an existing computer monitor into a three dimensional display.

With respect to FIG. 3, "L" represents the distance separating the upper display area of 8 from the viewer, "D" is the width of the upper displaying area while "a" is the angle describing the range from where the viewing conditions are optimal. In a louver filter of the type shown in FIG. 4, there are two important geometrical parameters: the angle "b" and the "H"/ "S" ratio. These parameters must be adequately chosen in order to obtain optimal viewing conditions. Their choice has to take into account the viewing range angle "a" and the minimum distance "L" from where a viewer can watch the stereoscopic display. As an example for an "L/D" ratio of 4 and a louver filter having an angle "b" of 38 degrees (on a 360 degree scale) and an "S/H" ratio of 5/3 a vertical viewing range "a" of 28 degrees is obtained. In this range the attenuation of the displayed image caused by the louver filters will be 33% in the worst cases.

In the previous example the louver type filter has slats elements spaced apart at a constant rate "S" while their angular inclination "b" is constant. Better results can be obtained with louver type filters where said elements have their angular inclination and spacing varying continuously from the semitransparent mirror toward the exterior.

The previous examples should not be in any case interpreted as limiting the scope of the invention only to the above described embodiments for the louver type filters. The embodiments previously described are given only as an example. Other geometries can be employed in order to obtain the same effect. Also it is to be noted that the relative position between the louver type filter and its corresponding image displaying device could vary. For instance, the louver filters, the polarizing means, and the image displaying device may or may not form one body. Also it is understood that the assignment of the left and right eye view to each image displaying element can be reversed.

The system works as follows. The image display 1 generates the right eye view of the stereoscopic pair. The light rays generated from said device pass through the polarizing means 3. Only light rays having the proper polarization are able to pass through. Then, the polarized light rays will pass through the semitransparent mirror 6. Finally they will reach both filters of the stereoscopic spectacle 7, that the viewer wears. Because of their polarization, these light rays will pass only through the filter placed in front of the viewer's right eye. Similarly the image display 2 generates the reversed left eye view of the stereoscopic pair. The light rays generated from said device pass through the polarizing means 4. Only light rays having the proper polarization are able to pass through. Then, some of the polarized light rays will head toward the viewer eyes but they will be stopped by the slats of louver 5. The polarized light rays that head toward the semitransparent mirror 6 will be reflected toward the viewer. Because of the reflection, the left eye view image is now reversed to its proper orientation. Finally, the polarized light rays will reach both filters of the stereoscopic spectacle 7, that the viewer wears. Because of their polarization these light rays will pass only through the filter placed in front of the viewer's left eye. Having two different views of the same three dimensional scene, the user will perceive the stereoscopic effect. Both light ray streams that carry the left eye view and the right eye view will have an identical degree of attenuation. The attenuation due to the louver filters 5 and 9 varies identically because of their symmetry with respect to the semitransparent mirror 6.

What is claimed is:

1. A stereoscopic viewing system comprising:

a first image displaying means showing the reversed left eye view of a three dimensional scene;

a second image displaying means showing the right eye view of said three dimensional scene, said displaying means being placed such that the superior edge of said second image displaying means and the inferior edge of said first image displaying means are either in contact or are slightly spaced apart;

a semitransparent mirror placed between said first and second image displaying means in order to superimpose the images generated by said first and second image displaying means on a common viewing area;

a first polarizing filter that polarizes light rays coming from said first image displaying means before being reflected by said semitransparent mirror;

a second polarizing filter that polarizes light rays coming from said second image displaying means before passing through said semitransparent mirror, the polarizing directions of said first and second polarizing filters being chosen such that the polarizing direction of light rays reflected on said semitransparent mirror is orthogonal on the polarizing direction of light rays that have passed through said semitransparent mirror;

a first louver type filter placed above said first image displaying means and operating on light rays coming from said first image displaying means in such a way that light rays coming directly to the viewer eyes are suppressed or strongly attenuated while light rays coming to the viewer eyes through reflection on said semitransparent mirror are only slightly attenuated;

a second louver type filter placed between said second displaying means and said semitransparent mirror, and inducing a slight attenuation on light rays travelling from said second image displaying means toward the viewer eyes in such a way that said slight attenuation is equal to the attenuation induced by said first louver type filter on light rays travelling from said first image displaying means toward the viewer eyes through reflection on said semitransparent mirror; and a viewing device consisting of a pair of polarizing means that the viewer wears in front of his eyes, said polarizing means having their planes of polarization oriented in such a way that each eye perceives only the corresponding view of said three dimensional scene.

2. A stereoscopic viewing system as claimed in claim 1 wherein said first and second louver type filters are symmetrical with respect to said semitransparent mirror.

3. A stereoscopic viewing system as claimed in claim 2 wherein said first and second image displaying means are juxtaposed display areas of the same viewing screen.

* * * * *

UNITED STATES PATENT AND TRADEMARK OFFICE
CERTIFICATE OF CORRECTION

PATENT NO. : 5,854,706
DATED : Dec. 29, 1998
INVENTOR(S) : Alb

It is certified that error appears in the above-identified patent and that said Letters Patent is hereby corrected as shown below:

On the title page, in item [76] Inventor: delete
"2450 Athlone, #607, Montreal, Quebec, CA, H3R 3H6"
and replace with the following address
--Str. Madrid nr. 5, Sector 1, Cod 71222, Bucharest, Romania--.

Signed and Sealed this

Eleventh Day of May, 1999

*Attest:*

Q. TODD DICKINSON

*Attesting Officer*      *Acting Commissioner of Patents and Trademarks*